Oct. 25, 1966  E. ISKENDERIAN  3,280,806
HELPER SPRING FOR VALVE ACTUATING MECHANISM
Filed Dec. 8, 1964
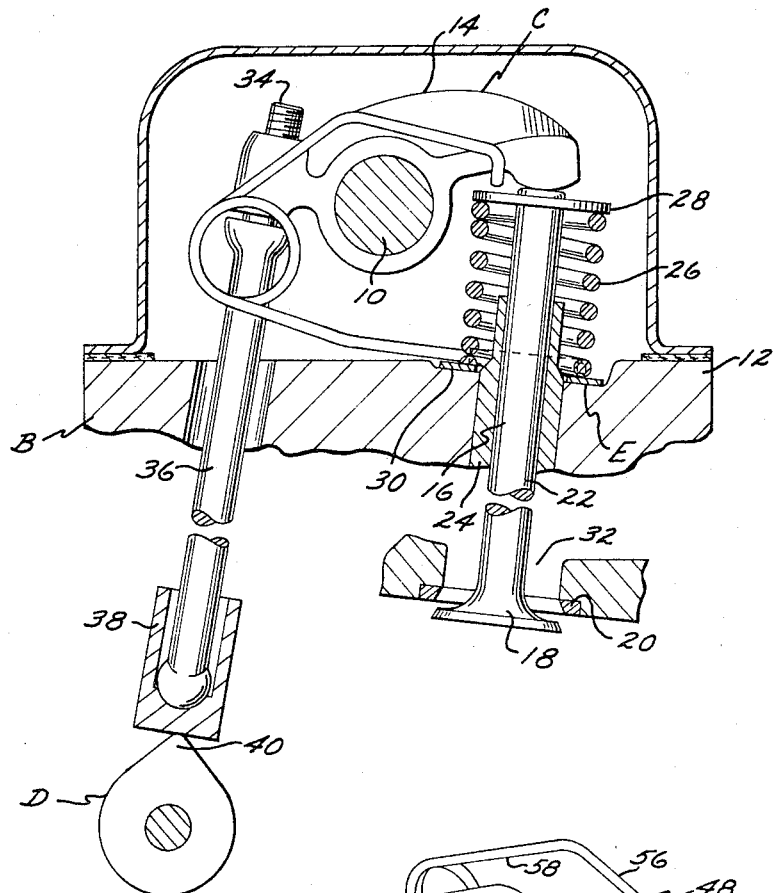
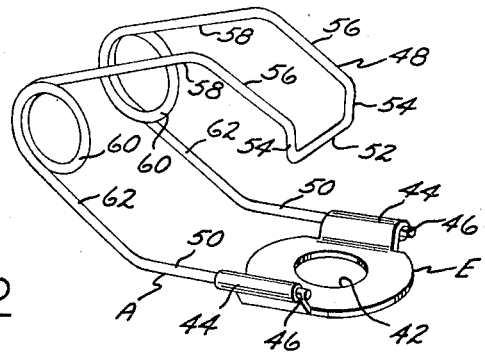
INVENTOR.
EDWARD ISKENDERIAN
BY
William C. Babcock
ATTORNEY

United States Patent Office 3,280,806
Patented Oct. 25, 1966

3,280,806
HELPER SPRING FOR VALVE ACTUATING
MECHANISM
Edward Iskenderian, 607 N. Inglewood Ave.,
Inglewood, Calif.
Filed Dec. 8, 1964, Ser. No. 416,765
5 Claims. (Cl. 123—90)

The present invention relates generally to the field of automotive accessories, and more particularly to a helper spring for use in an internal combustion engine to maintain the rocker arm assembly in operative engagement with a cam shaft, independently of the compressed spring that keeps a valve head in sealing engagement with a seat.

As the power of the modern, high-speed internal combustion engine has increased in recent years, the operating conditions to which valves are subjected has likewise in severity. This increase in power has been developed by creating tremendous pressure in the combustion chambers of the engine. The function of the valves is to hold and control these pressures, both when the engine is idling as well as when operating at high speed. Inasmuch as the power output of the modern engine is dependent on maintaining a high compression ratio, it will be readily apparent that the efficiency of an engine will be drastically reduced if the intake on the exhaust valves do not fully seat during the periods of the firing cycle in which they are expected to remain in this position.

In a typical overhead valve mechanism, a compressed spring at all times tends to move a valve stem upwardly to place a valve head in sealing engagement with a seat. This tendency of a valve stem to move upwardly causes a rocker arm associated therewith to be pivoted in a direction to maintain a tappet located on the lower end of a push rod in pressure contact with a portion of a cam shaft.

As rotation of the cam shaft occurs, lobes thereon sequentially rotate under the tappets to pivot the rocker arms to open the intake and exhaust valves by moving the stems thereof downwardly to further compress the springs associated therewith. After each lobe has passed under a tappet, the spring associated with that particular tappet is free to expand to a degree, and in so doing return a valve to a closed position. Each spring must move the valve associated therewith from an open to a closed position in an extremely short interval of time. Also, in moving a valve from an open to a closed position, the spring must pivot a rocker arm, and move a push rod and tappet to maintain the latter in contact with the cam shaft. To move a valve from the open to the closed position in the required short interval of time, requires a spring of substantial strength, for the spring must not only overcome the inertia of the valve, but that of the rocker arm mechanism as well.

The use of highly tensioned springs, while assuring proper closing of the valves, also has numerous disadvantages, one of which is that the valve may be stretched, and ultimately break as a result of this deformation. Another disadvantage is that when the valve stem stretches, the upper end thereof is elevated and places an undue strain on the rocker arm assembly during operation thereof. Also, the use of highly tensioned springs develops excessive pressure contact between the tappets and cam shaft, with the latter frequently wearing to such an extent that a valve but partially opens. A highly tensioned spring also causes the valve head to impact on the seat associated therewith with such force as to damage the same.

If a weakly tensioned spring is used with a valve, it may not exert sufficient force to close the valve in the required short interval of time. Also, the valve may not fully seat, but flutter, and flutter on the part of an exhaust valve is particularly detrimental, for it not only results in a loss of power, but exposes the upper surface of the valve head and lower portion of the valve stem to the high temperatures of exhaust gases for an excessive period of time without cooling. This brings about warpage, burning, pitting, and out-of-round wear of the exhaust valve. If the exhaust valve closes correctly, the high temperature to which it is momentarily exposed during the firing portion of the cycle is dissipated during the time it is in contact with the seat, which is water-cooled. Fluttering of the exhaust valve also encourages the deposit of carbon on the valve head, valve stem and seat. Such deposits tend to prevent the valve head from effecting a tight seal with the seat when the valve is in the closed position. Also, carbon is not a good heat conductor, and localized deposits thereof on the valve and seat develop hot spots which encourage warping and out-of-round wear.

A major object of the present invention is to provide a helper spring that may be removably held in position on an overhead valve internal combustion engine by the valve spring, with the helper spring when so held independently maintaining the rocker arm assembly in pressure contact with the cam shaft, and allowing the valve spring to perform a single function, that of returning and maintaining the valve with which it is associated in a fully seated position.

Another object of the invention is to supply a helper spring of extremely simple mechanical structure which is simple and easy to install, can be fabricated from standard commercially available materials, and will substantially improve the performance of an engine on which it is installed.

Yet another object of the invention is to provide a helper spring that will assure full seating of the valve with which it is associated without damage to the valve, seat, or cam shaft as occurs when highly tensioned valve springs are used.

A still further object of the invention is to provide a helper spring which permits the use of a lighter valve spring than normally employed, for the function of the spring is simply to accelerate the valve with which it is associated from an open to a closed position, rather than the spring having to move the valve as well as a rocker arm assembly.

These and other objects and advantages of the invention will become apparent from the following description of a preferred form thereof, and from the accompanying drawing illustrating the same, in which:

FIGURE 1 is a fragmentary, vertical cross-sectional view of an overhead valve internal combustion engine with the helper spring installed thereon; and FIGURE 2 is a perspective view of the helper spring.

With continued reference to the drawing, one of the helper springs A is shown in perspective in FIGURE 2 that is adapted to be used in combination with an internal combustion engine B having the typical overhead valve mechanism C shown in FIGURE 1. The valve mechanism C includes a shaft 10 that is supported at a fixed distance relative to the cylinder head 12 of the engine by means not shown. A rocker arm 14 is pivotally supported on shaft 10.

A valve 16 is shown in FIGURE 1 which can be either an exhaust or intake valve. Valve 16 includes a head 18 that is adapted to sealingly engage a seat 20. A stem 22 projects upwardly from head 18 and is slidably supported in a tubular guide 24. A compressed helical spring 26 encircles the upper portion of the valve stem 22, and a spring retainer 28 is mounted on the upper end of this stem.

The upper end of spring 26 is at all times in abutting contact with the lower surface of retainer 28. The lower end of spring 26 normally rests in a recessed seat 30 defined in the exterior of the head 12, as shown in FIGURE 1. Spring 26 at all times tends to move valve 16 upwardly to dispose a face of head 18 in sealing engagement with the circular seat 20 defining the inner extremity of a port 32.

An adjusting screw 34 is mounted on the left-hand end portion of rocker arm 14 and is connected by conventional means (not shown) to the upper end of a push rod 36. The lower end of push rod 36 is disposed in a tappet 38 that is rotatably engaged by a cam shaft D.

Cam shaft D is rotated in synchronism with the crankshaft (not shown) by means likewise not shown. When a lobe 40 on cam shaft D rotates upwardly, it moves one of the tappets 38 and push rods 36 upwardly to pivot one of the rocker arms 14 in a clockwise direction, as illustrated in FIGURE 1, with the right-hand end of the rocker arm moving the valve 16 downwardly to the open position. As lobe 40 rotates out of contact with tappet 38, the compressed spring 26 expands, and not only moves the valve 16 to a closed position, but pivots the rocker arm 14 in a counter clockwise direction to maintain tappet 38 in pressure contact with cam shaft D.

The helper spring A shown in FIGURE 2 includes a base plate E of such shape as to be disposable in the seat 30. A centrally positioned opening 42 is formed in plate E, and is of such cross section that the upper part of the valve guide 24 can project therethrough. Two tabs 44 extend outwardly from plate E, which by a forming operation, are shaped into a tubular configuration to define two parallel, laterally spaced passages 46.

A resilient wire bail 48 that acts as a spring is provided, that includes two parallel legs 50 which can be inserted into passages 46, with the bail 48 then being removably supported from the plate E. Bail 48 includes a rocker arm, which engages a cross piece 52 that has two short legs 54 extending upwardly from the ends thereof. The upper ends of legs 54 develop into two parallel first wire sections 56 that extend upwardly and outwardly relative to plate E. The sections 56 in turn develop into two second sections 58 which extend downwardly and merge into two looped portions 60, which latter portions develop into two third downwardly extending sections 62 that merge into the outer ends of legs 50.

The use and operation of the invention are relatively simple. The shaft 10, rocker arms 14, spring retainers 28, and springs 26 are removed from the engine B. The plates E are then positioned on the seats 30, with the guides 24 extending upwardly through the openings 42 therein. The original springs 26, or lighter springs (not shown) if desired, are positioned in abutting contact with plates E (FIGURE 1), and the retainers 28 again mounted on the upper ends of valve stems 22. At the time of being positioned on seats 30, the plates E are so arranged that the passage-defining tabs 44 are disposed transversely relative to the head 12. The shaft 10 and rocker arms 14 are then reassembled on the engine B, in the manner shown in FIGURE 1. Thereafter the springs 48 are mounted on engine B by slidably inserting the legs 50 into passages 46, with the cross pieces 52 positioned under the lower right-hand portions of the rocker arms 14, as shown in FIGURE 1. Engine B is then ready to operate.

For the engine B to operate at peak efficiency up to the maximum r.p.m. at which it will be used, the spring 26 is employed which is preferably of just sufficient strength and resiliency as to accelerate one of the valves 16 from an open to a closed position in a time interval required to permit the right-hand end of rocker arm 14 to oscillate from its lowermost to its uppermost position. A spring 26 of greater strength and resiliency, produces detrimental results in the operation of the engine B, for the cam shaft D is required to do useless work in the operation of the engine which detracts from the power output thereof.

What has been said of the spring 26 is equally true with regard to each spring or bail 48, which has just sufficient strength and resiliency that the cross piece 52 will tend to move upwardly at a slightly greater velocity than that of the right-hand end of rocker arm 14 when the cross piece is in contact therewith to maintain the tappets 38 in contact with cam shaft D.

The bails 48 are removable from the plates E when the plates are mounted on engine B, as shown in FIGURE 1. Accordingly, bails 48 of different strength and resiliency can be easily tried out on the engine B with a minimum of effort until those of such strength and resiliency are found that give optimum power output from the engine.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:
1. In combination with an internal combustion engine having an overhead valve mechanism that includes a plurality of rocker arms which are sequentially oscillated by a plurality of push rods as a cam shaft forming a part of said engine rotates, a plurality of helper springs which at all times tend to move said rocker arms into positions where said push rods will be actuated by said cam shaft, with said engine also including a plurality of valves, the stems of which are slidably mounted in guides that project above the head of said engine, a plurality of compressed helical springs encircling portions of said guides and stems, and a plurality of retainers mounted on the upper ends of said stems against which the upper ends of said helical springs abut, with each of said helper springs comprising:
   (a) a base plate having an opening formed therein through which the upper portion of one of said guides extends, said plate resting on the upper surface of said head, with the lower end of one of said compressed helical springs being in abutting contact with the upper surface of said plate;
   (b) a spring in the form of a bail that defines a cross piece which is removably engaged with an end portion of one of said rocker arms and at all times exerts a force on said rocker arm in a direction to maintain the push rod associated with said rocker arm in a position to be actuated as said cam shaft rotates, which spring defines two laterally spaced legs that are connected to said plate to support said spring therefrom.

2. A helper spring as defined in claim 1 wherein those portions of said plate-supported spring between said plate and said cross piece are at all times under tension, with said portions being of such strength and resiliency that said cross piece when not subjected to the load of the rocker arm and push rod associated therewith tends to be moved upwardly by said portions at a more rapid rate than is possible for the rocker arm to oscillate upwardly when said cam shaft is rotating at the maximum rate to which it will be subjected in the operation of said engine.

3. A helper spring as defined in claim 1 which further includes:
   (c) means on said plate for removably engaging said legs to support said spring from said plate.

4. A helper spring as defined in claim 1 wherein said two laterally spaced legs are parallel, which spring further includes:
   (c) means on said plate for defining two laterally spaced, parallel passages in which said legs can be slidably and removably inserted to support said spring from said plate.

5. A helper spring as defined in claim 4 wherein said means comprise two oppositely disposed tabs that form a part of said plate and which have been permanently deformed into tubular configurations through which said passages extend.

References Cited by the Examiner
UNITED STATES PATENTS

| | | | |
|---|---|---|---|
| 1,410,771 | 3/1922 | Strohl | 123—90 |
| 1,475,557 | 11/1923 | Albrecht | 123—90 |
| 1,728,149 | 9/1929 | Berne | 123—90 |
| 2,527,604 | 10/1950 | Walk | 267—1 X |
| 2,619,946 | 12/1952 | Michelich. | |
| 3,139,872 | 7/1964 | Thompson | 123—90 |

MARK NEWMAN, *Primary Examiner.*
AL LAWRENCE SMITH, *Examiner.*